(12) United States Patent
Shoemaker et al.

(10) Patent No.: US 7,646,333 B2
(45) Date of Patent: Jan. 12, 2010

(54) PSEUDO-RANDOM PULSE INTERVAL GENERATION IN NAVIGATION-AIDING DEVICES

(75) Inventors: Mark S. Shoemaker, Plymouth, MN (US); Peter Peterson, New Brighton, MN (US); Curtis J. Petrich, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/133,238

(22) Filed: Jun. 4, 2008

(65) Prior Publication Data

US 2009/0303104 A1  Dec. 10, 2009

(51) Int. Cl.
*G01S 5/02* (2006.01)
*G01S 13/08* (2006.01)
*H04J 3/06* (2006.01)

(52) U.S. Cl. .................. 342/120; 342/131; 342/421
(58) Field of Classification Search .............. 342/120, 342/128, 130, 131, 420, 421; 370/505, 520; 708/250
See application file for complete search history.

(56) References Cited

U.S. PATENT DOCUMENTS

| | | | |
|---|---|---|---|
| 3,721,981 A | | 3/1973 | Allard et al. |
| 3,882,493 A | * | 5/1975 | Bolger ................. 342/136 |
| 3,961,169 A | * | 6/1976 | Bishop et al. .......... 708/250 |
| 3,963,869 A | * | 6/1976 | Caldwell ............... 370/505 |
| 4,049,953 A | | 9/1977 | Evans, Jr. |
| 4,511,988 A | * | 4/1985 | Michel et al. .......... 708/250 |
| 5,347,283 A | | 9/1994 | Krizek et al. |
| 5,583,512 A | | 12/1996 | McEligot |
| 5,847,677 A | | 12/1998 | McCorkle |

FOREIGN PATENT DOCUMENTS

| | | |
|---|---|---|
| GB | 1351096 | 4/1974 |
| GB | 2337387 | 11/1999 |

* cited by examiner

*Primary Examiner*—Dao L Phan
(74) *Attorney, Agent, or Firm*—Fogg & Powers LLC

(57) ABSTRACT

An electronic circuit comprises a randomizing bit generator configured to generate a randomizing bit sequence based on a sequence selection input signal. The randomizing bit generator includes a counter operable to provide an individual starting count for the randomizing bit sequence and a parity generator responsive to an output of the counter. The circuit further comprises a pseudo-random number generator responsive to the randomizing bit generator. The pseudo-random number generator is operable to provide at least one pulsed signal based at least in part on the random bit sequence. The electronic circuit is operable to substantially eliminate interference in a series of pulsed signal transmissions comprising the at least one pulsed signal from each of two or more navigation devices, where each of the pulsed signals from each of the navigation devices is separated by an automatically adjustable time interval.

20 Claims, 5 Drawing Sheets

PSEUDO-RANDOM PULSE INTERVAL GENERATION IN NAVIGATION-AIDING DEVICES

BACKGROUND

Typical pulsed radar altimeters determine an aircraft's altitude by measuring time from a transmitter radio frequency (RF) pulse to a receiver pulse signal reflected from the ground. In "mission-critical" avionic navigation systems, for example, the aircraft includes more than one pulsed radar altimeter for redundancy. For proper redundant navigation, a primary radar altimeter is configured to reject the reflected ground return signal from a second, companion radar altimeter.

However, when at least two transmitted RF signals from at least two pulsed radar altimeters are present, current redundant radar altimetry configurations do not always distinguish the receiver pulse signal for the primary radar altimeter from that of the companion radar altimeter. Consequently, the measured altitude has errors caused by these conflicting receiver pulse signals, and within a relatively short period of time the radar transmissions become jammed and ineffective. Moreover, the randomized time interval can become a repetitive sequence, similarly rendering the radar transmissions as being ineffective for navigation purposes.

For the reasons stated above and for other reasons stated below which will become apparent to those skilled in the art upon reading and understanding the present specification, there is a need in the art for methods of pseudo-random pulse interval generation in navigation-aiding devices.

SUMMARY

The following specification provides for pseudo-random pulse interval generation in navigation-aiding devices. Particularly, in one embodiment, an electronic circuit for generating pseudo-random pulse intervals is provided. The circuit comprises a randomizing bit generator configured to generate a randomizing bit sequence based on a sequence selection input signal. The randomizing bit generator includes a counter operable to provide an individual starting count for the randomizing bit sequence and a parity generator responsive to an output of the counter. The circuit further comprises a pseudo-random number generator responsive to the randomizing bit generator. The pseudo-random number generator is operable to provide at least one pulsed signal based at least in part on the randomizing bit sequence. The electronic circuit is operable to substantially eliminate interference in a series of pulsed signal transmissions comprising the at least one pulsed signal from each of two or more navigation devices, where each of the pulsed signals from each of the navigation devices is separated by an automatically adjustable time interval.

BRIEF DESCRIPTION OF THE DRAWINGS

These and other features, aspects, and advantages are better understood with regard to the following description, appended claims, and accompanying drawings where:

The various described features are drawn to emphasize features relevant to the embodiments disclosed. Like reference characters denote like elements throughout the figures and text of the specification.

DETAILED DESCRIPTION

Embodiments disclosed herein relate to pseudo-random pulse interval generation in navigation-aiding devices. For example, at least one embodiment relates to using sequence selection of one or more time interval generators for two or more individual pulsed radar altimeters present in a redundant altitude measurement system encompassing radar altimetry. In turn, each of the time interval generators provide each respective pulsed radar altimeter a unique transmitter pulse sequence configuration having near minimal receiver signal interference between each of the individual pulsed radar altimeters. For example, each of the pulsed radar altimeters will have individual starting times for their respective transmitted pseudo-random pulse sequences based on a sequence selection input signal.

In one implementation, a pseudo-random number (PRN) generator is programmed to increase a repeat cycle length and provide the pseudo-random pulse sequence configuration. For example, the PRN hardware components within the time interval generator comprise at least a randomizing bit generator circuit and selectable feedback taps to provide "scrambled" patterns of the pseudo-random pulse sequence. In addition, the randomizing bit generator circuit provides an individual starting count for each of the pulsed radar altimeters of the redundant radar altimetry system illustrated herein. In this same implementation, an optional frequency select switch within the time interval generator provides one or more clock frequency offsets based on the sequence selection input and configuration of each of the pulsed radar altimeters. The frequency select switch further enhances the methods of pseudo-random pulse interval generation discussed here.

It is understood that the methods of generating pseudo-random pulse intervals discussed herein are applicable in areas other than radar altimetry (for example, any area of electronic navigation where a pseudo-random interval generator having a sequence selection input configuration is warranted or desired). At least one embodiment is described below with reference to one or more of these applications for illustration. It is further understood that numerous specific details, relationships, and methods are set forth to provide a fuller understanding of the embodiments disclosed. Similarly, the operation of well known components and processes has not been shown or described in detail below to avoid unnecessarily obscuring the details of the embodiments disclosed.

Figure 1:
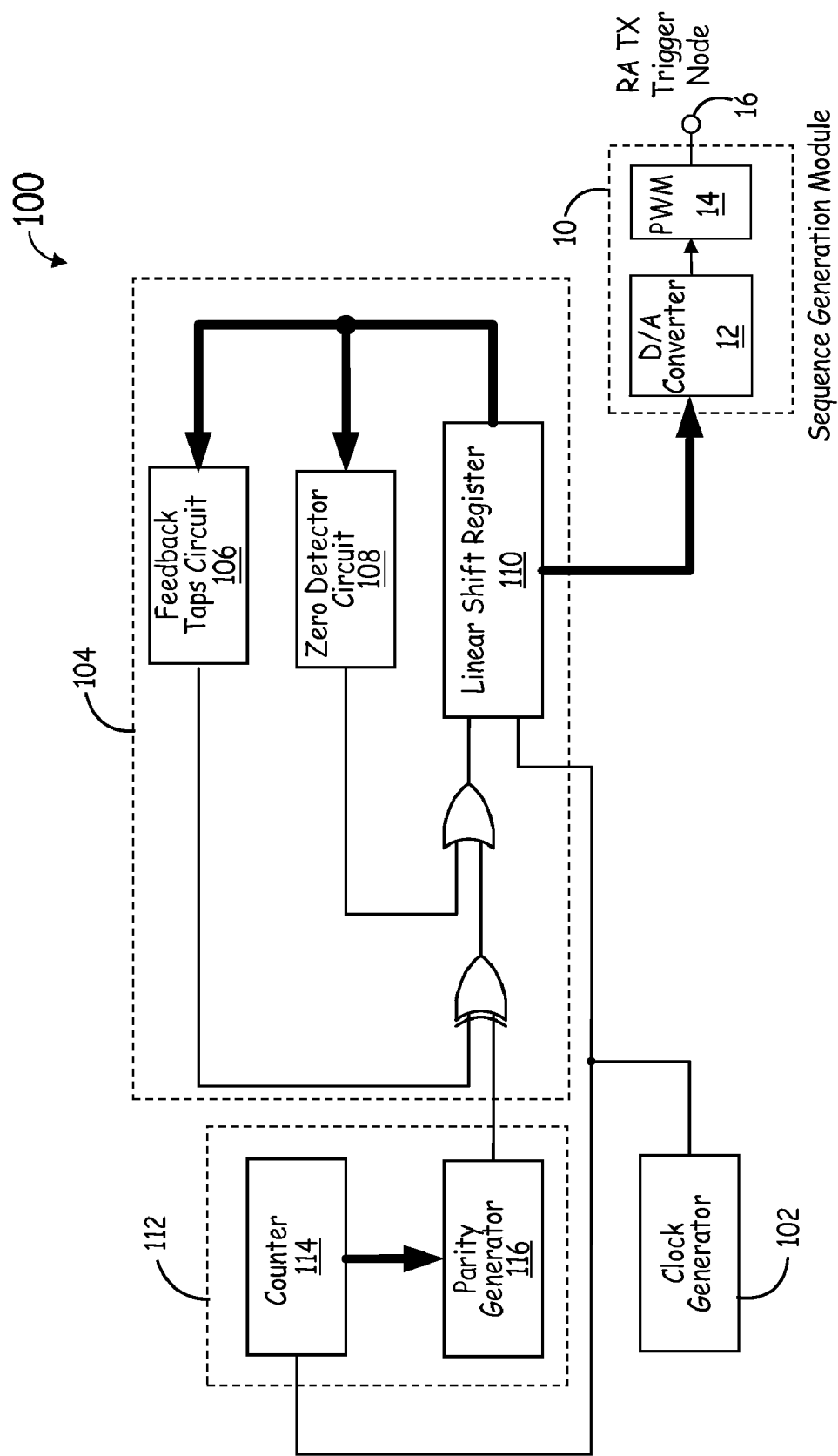
FIG. 1 is a block diagram of an embodiment of a pseudo-random pulse interval generation system.

FIG. 1 is a block diagram of an embodiment of a pseudo-random pulse interval generation system 100. In one embodiment, the system 100 is embedded in one or more pulsed radar altimeters. The system 100 comprises at least a clock generator 102, a pseudo-random number (PRN) generator 104, and a randomizing bit generator 112. In the example embodiment of FIG. 1, the PRN generator 104 comprises a linear shift register 110 communicatively coupled to the randomizing bit generator 112, and a feedback taps circuit 106 responsive to the linear shift register 110. In one embodiment, the feedback taps circuit 106 is a selectable feedback taps circuit 106. The linear shift register 110 comprises one or more flip-flop shift registers configured to provide a suitable number of states for a sequence selection, as discussed in further detail below with respect to a time interval generation circuit of FIG. 3. In one implementation, the PRN generator 104 further comprises a zero detector circuit 108 responsive to the linear shift register 110. The randomizing bit generator 112 comprises a counter 114 and a parity generator 116. In one embodiment, the counter 114 is a free running counter 114. The parity generator 116 is responsive to an output of the (free running) counter 114. In the example embodiment of FIG. 1, an even parity generated by the parity generator 116 is used as a pseudo-random pulse interval input signal to the linear shift register 110. In one implementation, the PRN generator 104 is an 8-bit PRN generator randomized by the randomizing bit generator 112 to provide a repeat cycle greater than at least 1,000,000 states.

In operation, a sequence generation module 10 coupled to the PRN generator 104 provides an RF transmitter trigger pulse signal representative of at least one pattern of a randomizing bit sequence from the randomizing bit generator 112. In one implementation, the sequence generation module 10 comprises a digital-to-analog (D/A) converter 12 that converts at least one parallel data output from the linear shift register 110 to a control signal for a pulse width modulator (PWM) 14. As shown in FIG. 1, the PWM 14 is coupled between the D/A converter 12 and a radar altimeter transmit (RA TX) trigger node 16. Based on the control signal from the PRN generator 104, the PWM 14 issues an RF transmitter pulse trigger signal from the RA TX trigger node 16 as at least one pulsed signal in a series of pulsed signal transmissions.

The pseudo-random pulse interval generation provided by the system 100 substantially eliminates interference between the series of pulsed signal transmissions from each pulsed radar altimeter in a dual radar altimeter installation, as further discussed below with respect to FIG. 4. For example, the feedback taps circuit 106 selects, at least in part, the at least one pattern of the randomizing bit sequence based on a number of states present in the linear shift register 110. The randomizing bit sequence pattern generated is present within the at least one parallel data output from the linear shift register 110. As discussed above, the linear shift register 110 provides the at least one parallel data output to the sequence generation module 10 for each of the pulsed radar altimeters in the dual radar altimeter installation.

As shown in FIG. 1, the PRN generator 104 includes exclusive-OR decision logic to further define the generated randomizing bit sequence pattern for the at least one pulsed signal in the series of pulsed signal transmissions. In one implementation, the zero detector circuit 108 detects and corrects a zero condition of the linear shift register 110 based on the randomizing bit sequence generated by the randomizing bit generator 112.

With respect to the randomizing bit generator 112, the counter 114 extends a length of the at least one pattern of the generated randomizing bit sequence based at least in part on the number of states present in the linear shift register 110. In addition, the parity generator 116 provides additional randomization to the sequences of states present in the linear shift register 110. For example, the parity generator 116 further modifies a pulse to pulse interval of the at least one parallel data output from the linear shift register 110 based on the even parity of the pseudo-random pulse interval input signal generated by the randomizing bit generator 112.

As noted above, FIG. 1 illustrates one embodiment of a pseudo-random pulse interval generation system. It is to be understood that other embodiments are implemented in other ways. Indeed, the system 100 illustrated in FIG. 1 is adaptable for a wide variety of applications.

Figure 2:
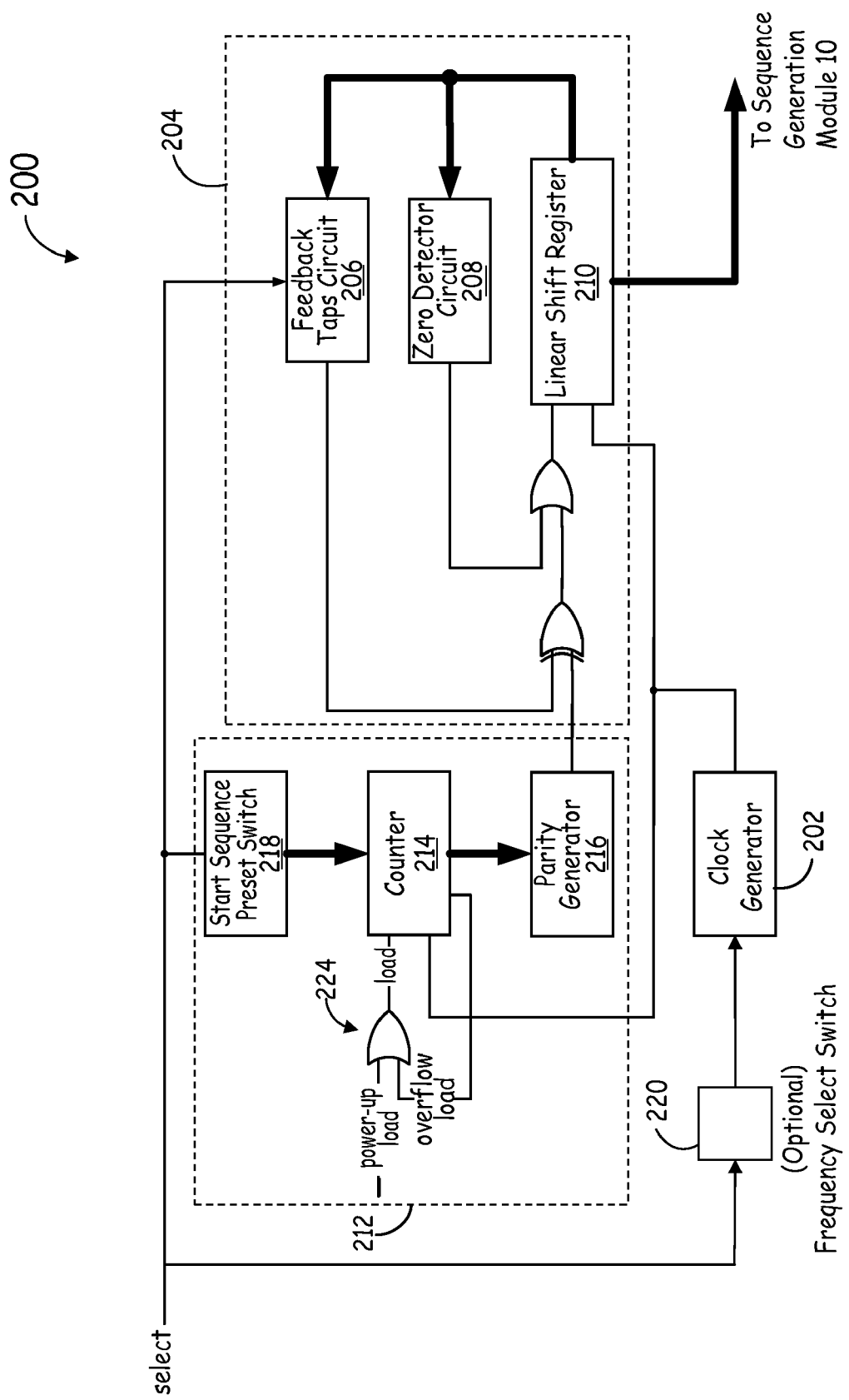
FIG. 2 is a block diagram of an embodiment of a pseudo-random pulse interval generator having a sequence selection input.

For example, FIG. 2 is a block diagram of an alternate embodiment of the pseudo-random pulse interval generation system in the form of a pseudo-random pulse interval generator 200 having a sequence selection input. The embodiment of the pseudo-random pulse interval generator 200 shown in FIG. 2 comprises at least a clock generator 202, a PRN generator 204, and a randomizing bit generator 212. The pseudo-random pulse interval generator 200 further comprises an optional frequency select switch 220 coupled to the clock generator 202 and further operable to receive a sequence selection input signal as shown in FIG. 2. In one implementation, the frequency select switch 220 alters a pulse transmission clock cycle between each of the one or more radar altimeters, as further discussed in detail below with respect to FIG. 4.

In the example embodiment of FIG. 2, the PRN generator 204 comprises a linear shift register 210 communicatively coupled to the randomizing bit generator 212, and a feedback taps circuit 206 responsive to the linear shift register 210. In one implementation, the PRN generator 204 further comprises a zero detector circuit 208 responsive to the linear shift register 210. The randomizing bit generator 212 comprises a counter 214 and a parity generator 216. The parity generator 216 is responsive to an output of the counter 214. In one implementation, the counter 214 is further coupled to the linear shift register 210. In one implementation, a counter preload circuit 224 is coupled to the counter 214 to provide a preset counter value.

Similar to the system 100 shown in FIG. 1, the randomizing bit generator 212 generates a randomizing bit sequence separated by an automatically adjustable time interval and at least partially based on the sequence selection input signal. For example, the sequence selection input signal is fed into the feedback taps circuit 206 and a start sequence preset switch 218. In one implementation, the start sequence preset switch 218 initializes the randomizing bit sequence for the counter 214 based on a configuration of the sequence selection input signal. The feedback taps circuit 206 is configured for a prescribed number of shift register states, as further discussed below with respect to FIG. 3. In at least one alternate implementation, the randomizing bit generator 212 starts the randomizing bit sequence at an individual starting count based on the sequence selection input signal. In the example embodiment of FIG. 2, the linear shift register 210 provides at least one parallel data output signal based at least in part on the altered pulse transmission clock cycle from the frequency select switch 220 and the clock generator 202. Moreover, the automatically adjustable time interval discussed above is representative of the altered pulse transmission clock cycle from the frequency select switch 220 and the randomizing bit sequence of the randomizing bit generator 212.

Figure 3:
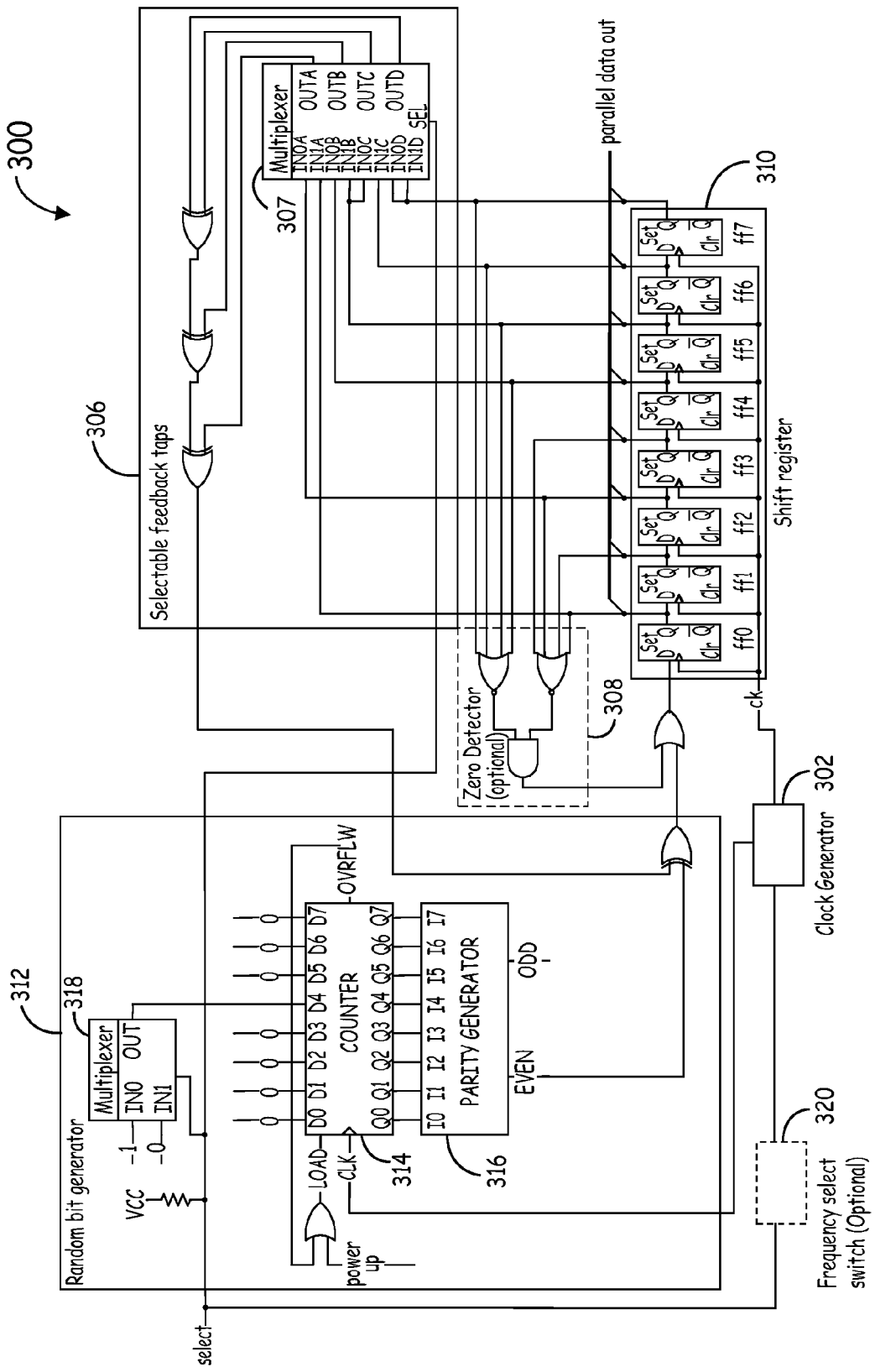
FIG. 3 is a schematic diagram of an exemplary implementation of a time interval generation circuit having a sequence selection input.

FIG. 3 illustrates an exemplary implementation of a time interval generation circuit 300 having a sequence selection input. The circuit 300 comprises at least a clock generator 302, a selectable feedback taps circuit 306, a linear shift register 310, and a randomizing bit generator 312. The clock generator 302 is coupled to the linear shift register 310. The clock generator 302 also provides a clock input signal to a counter 314 in the randomizing bit generator 312. The selectable feedback taps circuit 306 includes a tap select multiplexer 307. The randomizing bit generator 312 further comprises a count reset multiplexer 318 (configured as a start sequence preset switch as discussed above with respect to FIG. 2) and an N-bit parity generator 316. The circuit 300 further comprises an (optional) zero detector 308 coupled to the selectable feedback taps circuit 306 and the shift register 310 as shown in FIG. 3.

It is understood that the linear shift register 310 is capable of accommodating any appropriate number of states (for example, 1- to N-states) in a single shift register. In one embodiment, to determine the prescribed number of shift register states, the number of flip flops (FFs) for the linear shift register 310 is calculated as illustrated below with respect to Equation 1:

$$\text{ceiling}(\ln(\text{states})/\ln(2)) \quad \text{(Equation 1)}$$

For example, based on Equation 1 above, a design for the time interval generation circuit 300 requiring 256 states results in an 8-stage shift register having at least eight FFs. Accordingly, tap settings in the tap select multiplexer 307 are determined in part based on the number of FFs calculated for the shift register 310. Moreover, the tap configuration is further determined for the tap select multiplexer 307 from the control line "select" (as shown in FIG. 3) for selective randomization of the randomizing bit sequence.

In operation, the count reset multiplexer 318 provides a preset value for the counter 314 based on the configuration of the sequence selection input signal (shown in FIG. 3 as a control line "select"). The preset value is loaded into the counter 314 on power up of the circuit 300. When the counter 314 reaches a maximum count (for example, a count based on the resolution of the counter 314), the counter 314 sends an "overflow" data output directly to the parity generator 316. In the exemplary embodiment of FIG. 3, an even parity output of the counter 314 is provided by the parity generator 316 for the randomizing bit sequence from the shift register 310.

The time interval generation circuit shown in FIG. 3 provides at least two unique randomizing bit sequences based on the configuration of the sequence selection input signal. For example, each of the at least two unique randomizing bit sequences comprise a parallel data output from the linear shift register 310. In one implementation, the parallel data output is provided to a sequence generation module to generate pseudo-random pulsed signal transmissions from at least two navigation devices, as further illustrated below with respect to FIG. 4.

In the embodiment of FIG. 3, an (optional) frequency select switch 320 receives the sequence selection input. The frequency select switch 320 alters a pulse transmission clock cycle of the clock generator 302 based on a configuration setting of the sequence selection input. As a result, the altered pulse transmission clock cycle further shifts a random pulse sequence interval of the time interval generation circuit 300. For example, the altered pulse transmission clock cycle substantially eliminates any occurrences of a time coincidence for the pseudo-random pulsed signal transmissions provided for by the circuit 300.

Figure 4:
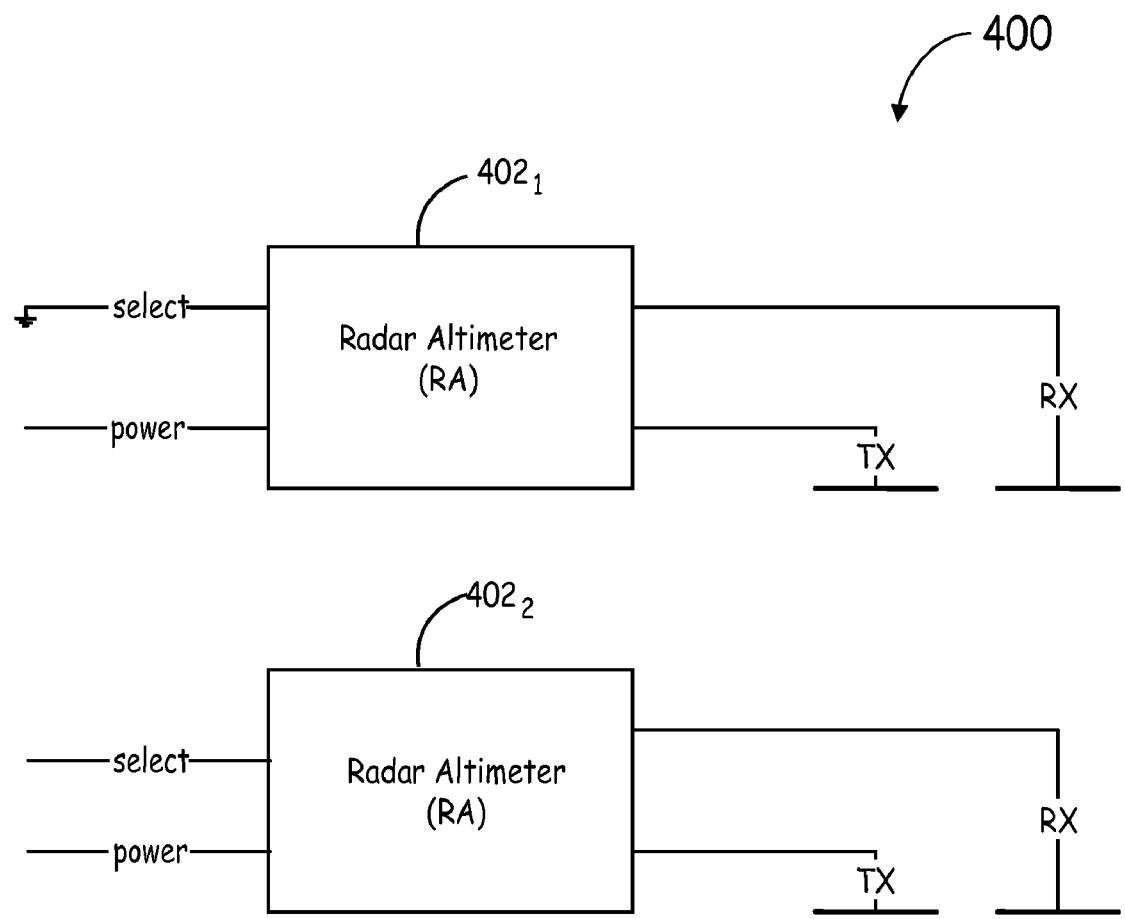
FIG. 4 is a block diagram of an embodiment of a dual radar altimeter installation with pseudo-random pulse interval generation.

FIG. 4 is a block diagram of an embodiment of a dual pulsed radar altimeter (RA) installation with pseudo-random pulse interval generation, indicated generally at 400. The configuration of FIG. 4 comprises one or more radar altimeters 402 (for example, RAs $402_1$, and $402_2$). As shown in FIG. 4, each RA 402 has a unique sequence selection input signal. For example, the sequence selection input signal for the RA $402_i$ is set to logic "0" (ground), and the sequence selection input signal is set to logic "1" for the RA $402_2$. Moreover, the sequence selection illustrated by the example embodiment of FIG. 4 is transparent to any assembly or manufacturing process. For example, using a single external input configuration setting, each of the time interval generators embedded in the RAs 402 will have a unique configuration. As discussed above with respect to FIGS. 2 and 3, the randomizing bit sequence provided by the time interval generators begins at an individual starting count based on the sequence selection input signal.

Figure 5:
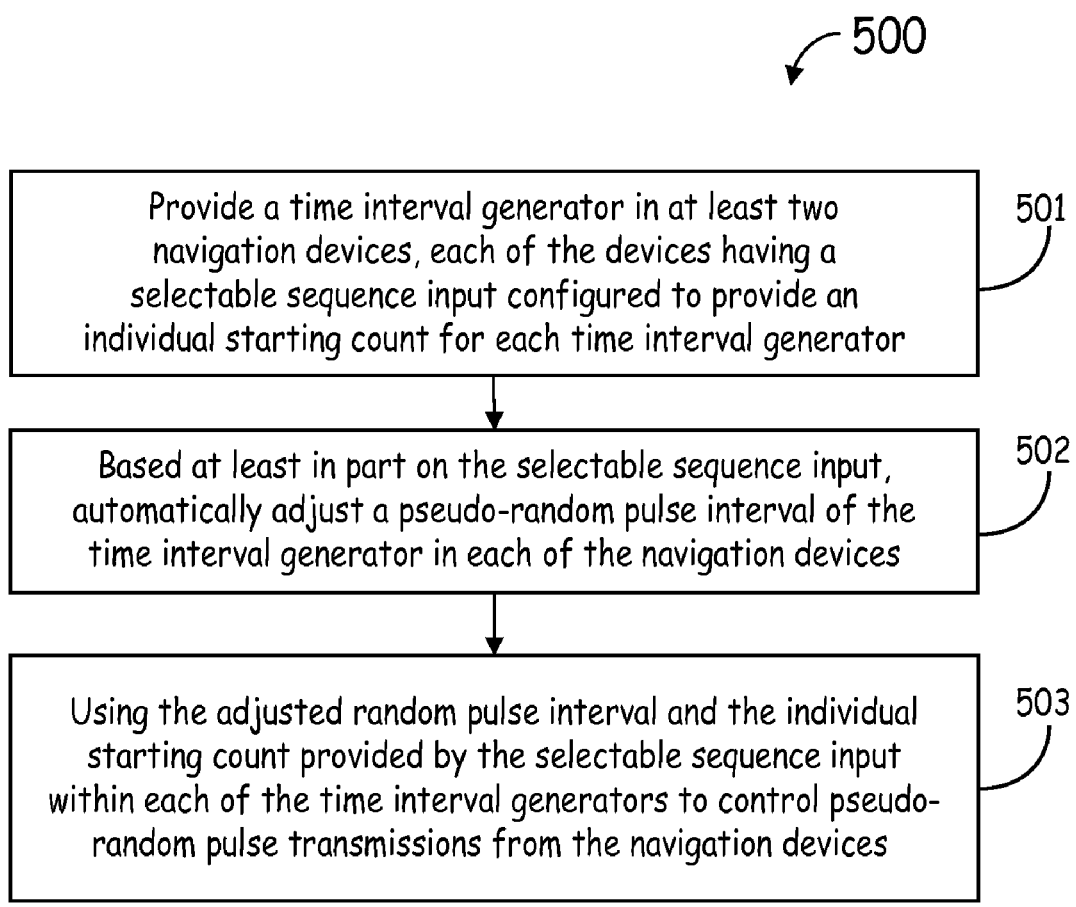
FIG. 5 is a flow diagram of an embodiment of a method for generating pseudo-random pulse intervals in navigation-aiding devices.

FIG. 5 is a flow diagram of an embodiment of a method 500 for generating pseudo-random pulse intervals in navigation-aiding devices (for example, the pulsed radar altimeters of FIG. 4). The method shown in FIG. 5 provides a time interval generator in at least two navigation devices, each of the navigation devices having a selectable sequence input configured to provide an individual starting count for each time interval generator (block 501). In one implementation, the time interval generator in the one or more electronic devices further selects at least one pseudo-random pulse sequence pattern with a pseudo-random number generator having selectable feedback taps and randomizing bit sequences. Based at least in part on the selectable sequence input, the time interval generator automatically adjusts a pseudo-random pulse interval of the time interval generator in each of the at least two navigation devices (block 502). In one implementation, the method 500 involves automatically adjusting the pseudo-random pulse interval of the time interval generator by determining the selectable sequence input and the pseudo-random pulse interval based on a desired pulse transmission sequence for a system with at least one configuration of the at least two navigation devices.

The time interval generator controls pseudo-random pulse transmissions from the at least two navigation devices using the automatically adjusted pseudo-random pulse interval and the individual starting count provided by the selectable sequence input (block 503). In one implementation, a frequency select switch is coupled between the selectable sequence input signal and a clock generator to alter a pulse transmission clock cycle of each of the at least two navigation devices. The optional frequency select switch provides one or more clock frequency offsets to the time interval generator in each of the at least two navigation devices.

This description has been presented for purposes of illustration, and is not intended to be exhaustive or limited to the embodiments disclosed. For example, the time interval generator can be composed of discrete logic components exclusively and implemented according to the method illustrated in FIG. 5 for generating pseudo-random pulse intervals. Moreover, the embodiments disclosed are intended to cover any modifications, adaptations, or variations which fall within the scope of the following claims.

What is claimed is:

1. An electronic circuit for generating pseudo-random pulse intervals, the electronic circuit comprising:
    a randomizing bit generator configured to generate a randomizing bit sequence based on a sequence selection input signal, the randomizing bit generator including:
        a counter operable to provide an individual starting count for the randomizing bit sequence, and
        a parity generator responsive to an output of the counter; and
    a pseudo-random number generator responsive to the randomizing bit generator, the pseudo-random number generator operable to provide at least one pulsed signal based at least in part on the randomizing bit sequence of the randomizing bit generator;
    wherein the electronic circuit is operable to substantially eliminate interference in a series of pulsed signal transmissions comprising the at least one pulsed signal from each of two or more navigation devices, and wherein each of the pulsed signals from each of the two or more navigation devices is separated by an automatically adjustable time interval.

2. The electronic circuit of claim 1, further comprising a frequency select switch configured to receive the sequence selection input signal, the frequency select switch operable to alter a pulse transmission clock cycle for a clock generator coupled to the pseudo-random number generator.

3. The electronic circuit of claim 1, wherein the randomizing bit generator further comprises:
   a start sequence preset switch responsive to the sequence selection input signal, the start sequence preset switch operable to initialize the randomizing bit sequence for the counter; and
   a counter preload circuit coupled to the counter to provide a preset counter value.

4. The electronic circuit of claim 1, wherein the parity generator is operable to modify a pulse to pulse interval of the at least one pulsed signal based on an even parity of the randomizing bit sequence.

5. The electronic circuit of claim 1, wherein the parity generator is further operable to provide additional randomization to a parallel data output sequence representative of the at least one pulsed signal of the pseudo-random number generator.

6. The electronic circuit of claim 1, wherein the pseudo-random number generator comprises:
   a linear shift register configured to provide at least one parallel data output signal based at least in part on the automatically adjustable time interval and the sequence selection input signal; and
   a selectable feedback taps circuit responsive to the linear shift register, the selectable feedback taps circuit operable to provide selective randomization of at least one pattern of the randomizing bit sequence based on a number of states present in the linear shift register.

7. The electronic circuit of claim 6, wherein the pseudo-random number generator further comprises a zero detector circuit responsive to the linear shift register, the zero detector circuit operable to detect and correct a zero condition of the linear shift register based on the randomizing bit sequence generated by the randomizing bit generator.

8. The electronic circuit of claim 6, wherein the counter of the randomizing bit generator extends at least one pattern length of the generated randomizing bit sequence based at least in part on a number of states present in the linear shift register.

9. A system for generating pseudo-random pulse intervals for pulsed radar altimeter installations, comprising:
   at least two pulsed radar altimeters, each of the at least two pulsed radar altimeters configured to have an individual sequence selection input configuration; and
   a time interval generator embedded in each of the at least two pulsed radar altimeters, the time interval generator including:
      a randomizing bit generator configured to generate a randomizing bit sequence based on the configured sequence selection input for each individual pulsed radar altimeter, the randomizing bit sequence for each individual pulsed radar altimeter separated by an automatically adjustable time interval; and
      a pseudo-random number generator responsive to the randomizing bit generator, the pseudo-random number generator operable to provide at least one pulsed signal based at least in part on the randomizing bit sequence of the randomizing bit generator;
   wherein the time interval generator for each of the at least two pulsed radar altimeters is operable to substantially eliminate interference between one or more pulsed signals in a series of pulsed signal transmissions from each of the at least two pulsed radar altimeters.

10. The system of claim 9, further comprising a sequence generation module for each of the at least two pulsed radar altimeters, the sequence generation module communicatively coupled to an output of the pseudo-random number generator in each of the at least two pulsed radar altimeters, the sequence generation module comprising:
    a digital-to-analog converter operable to provide a control signal representative of the randomizing bit sequence generated for each of the at least two pulsed radar altimeters; and
    a pulse width modulator coupled between the digital-to-analog converter and a radar altimeter transmit node, the pulse width modulator operable to issue, based on the control signal from the pseudo-random number generator, a radio-frequency (RF) transmitter trigger pulse signal from the radar altimeter transmit node as the at least one pulsed signal in the series of pulsed signal transmissions from each of the at least two pulsed radar altimeters.

11. The system of claim 9, wherein each of the time interval generators further comprise a clock generator coupled to the pseudo-random number generator, each of the clock generators operable to generate a pulse transmission clock cycle for each of the at least two pulsed radar altimeters.

12. The system of claim 11, further comprising a frequency select switch coupled to each of the clock generators, the frequency select switch operable to alter the pulse transmission clock cycle of each of the clock generators.

13. The system of claim 9, wherein the pseudo-random number generator comprises:
    a linear shift register configured to provide at least one parallel data output signal; and
    a feedback taps circuit responsive to the linear shift register, the feedback taps circuit operable to select, at least in part, at least one pattern of the randomizing bit sequence based on a number of states present in the linear shift register.

14. The system of claim 13, wherein the randomizing bit generator further comprises:
    a counter operable to extend a length of the randomizing bit sequence based at least in part on a number of states present in the linear shift register of the pseudo-random number generator; and
    a parity generator responsive to an output of the counter, the parity generator operable to provide additional randomization to the sequence of states present in the linear shift register of the pseudo-random number generator;
    wherein the randomizing bit generator starts the randomizing bit sequence generation at an individual starting count based on the sequence selection input signal for each of the at least two pulsed radar altimeters.

15. A method for generating pseudo-random pulse intervals in navigation-aiding devices, the method comprising:
    providing a time interval generator in at least two navigation devices, each of the at least two navigation devices having a sequence selection input configured to provide an individual starting count for each time interval generator;
    based at least in part on the sequence selection input, automatically adjusting a pseudo-random pulse interval of the time interval generator in each of the at least two navigation devices;

using the adjusted pseudo-random pulse interval and the individual starting count from the sequence selection input within each of the time interval generators to control pseudo-random pulse transmissions from the at least two navigation devices; and wherein the time interval generator for each of the at least two navigation devices is operable to substantially eliminate interference between at least one series of pseudo-random pulse transmissions from each of the at least two navigation devices.

16. The method of claim 15, wherein providing the time interval generator in the at least two navigation devices further comprises selecting at least one pseudo-random pulse sequence pattern with a pseudo-random number generator having selectable feedback taps and randomizing bit sequences.

17. The method of claim 15, wherein automatically adjusting the pseudo-random pulse interval of the time interval generator in each of the at least two navigation devices comprises determining the sequence selection input and the pseudo-random pulse interval based on a desired pulse transmission sequence for a system with at least one configuration of the at least two navigation devices.

18. The method of claim 15, wherein using the adjusted pseudo-random pulse interval and the individual starting count for each of the time interval generators further comprises providing one or more clock frequency offsets to the time interval generator in each of the at least two navigation devices.

19. The method of claim 18, wherein providing the one or more clock frequency offsets comprises configuring a frequency select switch to alter a pulse transmission clock cycle of each of the at least two navigation devices.

20. The method of claim 15, wherein the at least two navigation devices comprise at least two radar altimeters.

* * * * *